G. LAND.
VALVE.
APPLICATION FILED NOV. 24, 1909.

977,807.

Patented Dec. 6, 1910.

Witnesses
E. H. Fogerty.
E. W. Cressman.

Inventor
Gordon Land
By Adams & Brooks
Attorneys

UNITED STATES PATENT OFFICE.

GORDON LAND, OF SEATTLE, WASHINGTON, ASSIGNOR TO U. S. FLUSH TANK COMPANY, INC., OF SEATTLE, WASHINGTON, A CORPORATION OF WASHINGTON.

VALVE.

977,807.

Specification of Letters Patent. Patented Dec. 6, 1910.

Application filed November 24, 1909. Serial No. 529,783.

*To all whom it may concern:*

Be it known that I, GORDON LAND, a citizen of the United States of America, and a resident of the city of Seattle, in the county of King and State of Washington, have invented certain new and useful Improvements in Valves, of which the following is a specification.

My invention has particular reference to valve shifting mechanism, and resides in a novel provision for connecting a valve stem and lever, as hereinafter set forth and defined in the appended claims.

Figure 2:
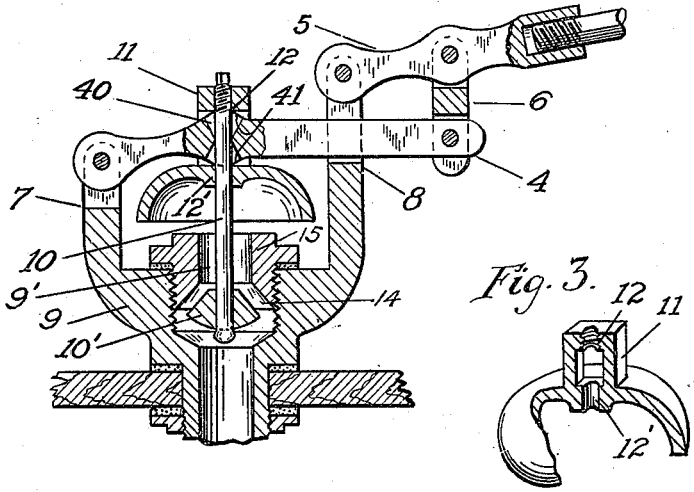
Figure 3:
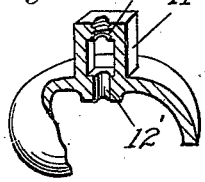
Figure 1:
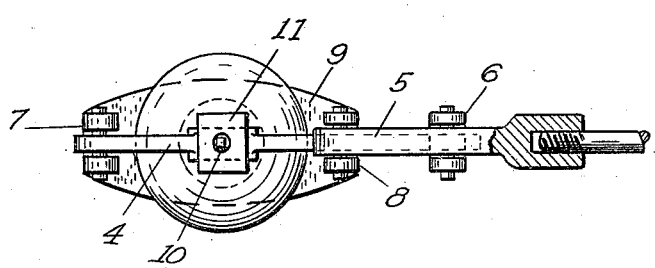
Figure 4:
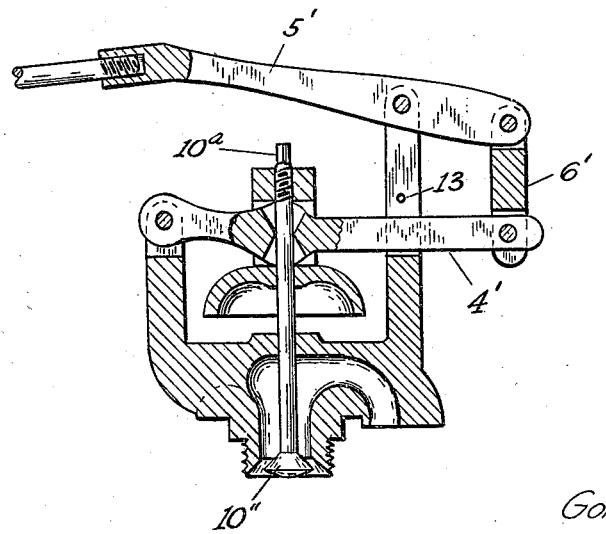

In the accompanying drawing, wherein like reference numerals designate corresponding parts throughout: Figure 1 is a plan of a valve with my improved shifting mechanism applied thereto. Fig. 2 is a vertical section of the same. Fig. 3 is a perspective of the valve stem head with a portion thereof broken away, and Fig. 4 is a vertical section of a valve of modified form, equipped with my improved shifting mechanism.

While both of the valves shown are adapted for use as intake valves in connection with flushing apparatus, such as siphon flush tanks, my invention may be applied to valves of a different form, as will be readily understood from the following description.

In Figs. 1 and 2 I have shown levers 4 and 5 connected by a link 6 and fulcrumed respectively on lugs 7 and 8, provided on the valve body 9 at opposite sides of the stem 10 of valve 10'.

Reference numeral 14 indicates the valve seat which is conveniently provided on a removable plug 15. Lever 4 extends in crosswise relation to stem 10 and is provided with an opening 40 which receives the stem freely and is suitably flared for clearance of the latter when the lever is moved to various angular positions. This opening extends between convex edge surfaces 41 which are provided on lever 4 for riding engagement with opposing bearing surfaces of a head 11 of the valve stem. Head 11 is provided with a suitable slot or opening which receives the adjacent portion of lever 4 snugly but freely, and in the top and bottom walls of this slot or opening, apertures, as 12, 12' are provided. Aperture 12 is screw threaded for engagement with corresponding screw threads provided on the valve stem, whereby the latter may be conveniently adjusted longitudinally with respect to the head. The base portion of head 11 is preferably extended in the form of a bell, as clearly shown, to provide a deflector over the passage-way 9', which leads from the seat of valve 10'. Upward movement of lever 5, elevates stem 10 through the medium of link 6, lever 4 and head 11 and thereby draws valve 10' toward its seat. The degree of such movement of lever 5 required to close the valve may be expeditiously regulated, as may be desired, by application of a wrench to the upper end portion of stem 10 to turn the latter in its seat in head 11, as will be readily understood.

The construction and arrangement of the shifting mechanism disclosed in Fig. 4, is identical to that just described excepting that lever 5' appears in connection with link 6' as a lever of the first order. By this arrangement, valve 10'' will be drawn upwardly toward its seat upon downward movement of lever 5'. Such movement of the lever is however, limited by a stop, as 13, provided in the path of lever 4'. Valve 10'' may therefore be adjusted by proper manipulation of stem 10ª, to lie clear of its seat when lever 5' is lowered, as may be desired in using the valve as a ball cock or float valve in automatic siphon flush tanks.

Having thus fully described my invention, what I claim as new and desire to secure by Letters Patent of the United States, is:

1. In combination with a movable valve and the stem thereof, an operating means for said valve including a lever formed with opposite convex surfaces and having an opening extending through the same and freely receiving said stem, and a connection between said valve stem and said lever comprising a head secured to said valve stem and provided with spaced bearing surfaces for riding engagement with the convex surfaces of said lever.

2. In combination with a movable valve and the stem thereof, an operating means for said valve including a lever formed with opposite convex surfaces and having an opening extending through the same and freely receiving said stem, and a connection between said valve and said lever comprising a head secured to said valve stem and formed with an opening through which said lever projects with its convex surfaces in riding engagement with the adjacent opposite walls thereof.

3. In combination with a movable valve and the stem thereof, a head adjustable on said valve stem formed with an opening, and an operating means for said valve including a lever projecting through the opening of said head and being free for angular movement therein.

4. In combination with a movable valve and the stem thereof, a head on said stem having its lower portion enlarged to form a deflector, and operating means for said valve including a lever having connection with said head.

5. In combination with a movable valve and the stem thereof, said stem having an externally threaded free end portion, a head formed with an opening provided in its opposite walls with alining apertures one of which is threaded, said apertures normally adjustably receiving said valve stem, and valve operating means including a lever projecting through and freely engaged in the opening of said head.

Signed at Seattle, Washington this 8th day of November 1909.

GORDON LAND.

Witnesses:
A. A. BOOTH,
FRANK E. ADAMS.